United States Patent
Han et al.

(10) Patent No.: US 8,438,615 B2
(45) Date of Patent: May 7, 2013

(54) SYSTEM AND METHOD FOR SETTING UP SECURITY FOR CONTROLLED DEVICE BY CONTROL POINT IN A HOME NETWORK

(75) Inventors: See-Hee Han, Seoul (KR); Joo-Yeol Lee, Seoul (KR); Dong-Shin Jung, Suwon-si (KR); Fei Fei Feng, Suwon-si (KR); Je-Young Maeng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 816 days.

(21) Appl. No.: 12/578,213

(22) Filed: Oct. 13, 2009

(65) Prior Publication Data
US 2010/0095356 A1 Apr. 15, 2010

(30) Foreign Application Priority Data

Oct. 10, 2008 (KR) ......... 10-2008-0099751
Oct. 14, 2008 (KR) ......... 10-2008-0100836
Jan. 12, 2009 (KR) ......... 10-2009-0002282
Oct. 9, 2009 (KR) ......... 10-2009-0096461

(51) Int. Cl.
*H04L 29/06* (2006.01)

(52) U.S. Cl.
USPC .......................................... 726/4

(58) Field of Classification Search .......... None
See application file for complete search history.

(56) References Cited

U.S. PATENT DOCUMENTS

| 5,497,421 | A | 3/1996 | Kaufman et al. |
| 2004/0093526 | A1* | 5/2004 | Hirsch ............... 713/202 |
| 2004/0117386 | A1 | 6/2004 | Lavender et al. |
| 2005/0188193 | A1* | 8/2005 | Kuehnel et al. ...... 713/155 |
| 2007/0136800 | A1 | 6/2007 | Chan et al. |
| 2008/0070571 | A1 | 3/2008 | Nguyen et al. |

FOREIGN PATENT DOCUMENTS

EP 0 580 350 1/1994

\* cited by examiner

*Primary Examiner* — Hadi Armouche
*Assistant Examiner* — Malcolm Cribbs
(74) *Attorney, Agent, or Firm* — The Farrell Law Firm, P.C.

(57) ABSTRACT

A system and method for setting up security of a controlled device by a control point in a home network are provided, in which authority to perform a function intended by a user is acquired through authentication between the control point and the controlled device, a security channel is created for performing the function, and a credential setting used by the user is synchronized among controlled devices in the home network.

19 Claims, 18 Drawing Sheets

ACL SETTING (DEFAULT)

| | | Set | Install | Start |
|---|---|---|---|---|
| i | Manager | ● | ● | ● |
| i | Home Owner | ○ | ● | ● |
| i | Visitor | ○ | ● | ○ |

~400

CREDENTIAL SETTING

| | | 1 | 2 | 3 | 4 |
|---|---|---|---|---|---|
| i | Manager | aaaa | bbbb | | |
| i | Home Owner | cccc | dddd | gggg | |
| i | Visitor | eeee | ffff | | |

~401

402 — CREDENTIAL SETTING SYNCHRONIZATION

| Actions/Resouce | | Associated Roles | | | |
|---|---|---|---|---|---|
| ○ i | Create | Admin | ▽ | ▽ | |
| ◉ i | Browse | Admin | User | Guest | Change |
| ○ i | Play | Admin | User | ▽ | Delete |
| ○ i | Stop | Admin | User | ▽ | |
| ○ i | Stop | Admin | User | ▽ | |
| ○ i | "/Adult/*" | Adult | ▽ | ▽ | |

| i | Action: | Delete ▽ | Add Action |
|---|---|---|---|
| i | Resource: | "/Family/Public/" ▽ | Add Resource |

Back

FIG.10C

<Credential List>

| | Role | Associated Credentials | | | |
|---|---|---|---|---|---|
| ○ i | Admin | Jone | Jane | ▽ | Update |
| ○ i | User | Mike | Tom | ▽ | Delete |
| ○ i | Guest | Visitor1 | ▽ | ▽ | |
| ● i | Adult | Adult1 | ▽ | ▽ | |

| Credential Identity | Credential (PSK) | |
|---|---|---|
| i Visitor2 ↵ | 1kdejf | Add Credential |
| i Tom ▽ | t1o2m3 | Change Credential |

Back

FIG. 10D

SYSTEM AND METHOD FOR SETTING UP SECURITY FOR CONTROLLED DEVICE BY CONTROL POINT IN A HOME NETWORK

PRIORITY

This application claims priority under 35 U.S.C. §119(a) to a Korean Patent Application filed in the Korean Intellectual Property Office on Oct. 10, 2008 and assigned Serial No. 10-2008-0099751, a Korean Patent Application filed in the Korean Intellectual Property Office on Oct. 14, 2008 and assigned Serial No. 10-2008-0100836, a Korean Patent Application filed in the Korean Intellectual Property Office on Jan. 12, 2009 and assigned Serial No. 10-2009-0002282, and a Korean Patent Application filed in the Korean Intellectual Property Office on Oct. 9, 2009, and assigned serial No. 10-2009-0096461, the entire disclosure of each of which is hereby incorporated by reference.

BACKGROUND OF THE INVENTION

1. Field of the Invention

The present invention generally relates to a system and method for setting up security by authenticating and authorizing a control point or a user device using a home network middleware, Universal Plug and Play (UPnP). More particularly, the present invention relates to a method for managing an Access Control List (ACL) and sharing credentials mapped to roles that are objects to be authorized in the ACL among all controlled devices over a network, and an administration-mode control point for setting the security of a controlled device and a home network.

2. Description of the Related Art

In general, a home network is an Internet Protocol (IP)-based private network. The home network interconnects and controls various devices including Personal Computers (PCs), intelligent products, and wireless devices to a network in a common virtual computing environment referred to as middleware. Middleware enables communications among digital devices by interconnecting the devices in a peer-to-peer scheme. Home AV Interoperability (HAVI), UPnP, Java Intelligent Network Intra-structure (Jini), Home Wide Web (HWW), etc. have been proposed as middleware.

With the introduction of the Plug and Play (PnP) function to the current operating systems, the installation and set up of PC peripheral devices got much easier. Further, UPnP extends this convenient function to entire networks based on Internet standard technologies such as Transmission Control Protocol/Internet Protocol (TCP/IP), HyperText Transfer Protocol (HTTP), and eXtensible Markup Language (XML), thereby enabling the networking, particularly home networking of various electronic appliances, network printers, and network devices such as Internet gates.

A UPnP network includes a Controlled Device (CD) connected to and controlled by an IP-based home network and a Control Point (CP) for controlling the CD. In the UPnP network, the CP communicates with the CD using a UPnP protocol stack involving Internet protocols such as TCP/IP and HTTP and technologies such as XML and Simple Object Access Protocol (SOAP), according to the following steps:

Step 1 is addressing. The CP and the CD have respective IP addresses. When the CD joins the network, it receives an IP address by Dynamic Host Configuration Protocol (DHCP), or gets an IP address by an automatic IP function in the absence of a DHCP server in the network.

Step 2 is discovery. The CP discovers the CD or the CD advertises its location. The discovery stage is implemented by Simple Service Discovery Protocol (SSDP). If the CD is added to the network, the CD transmits an SSDP alive message to the network by an IP multicast function and the CP is made aware of the existence of the CD from the SSDP alive message. If the CP newly joins the network, the CP multicasts an SSDP Multicast-search (M-search) message to the network and, upon receipt of the SSDP M-search message, CDs transmit M-search response messages carrying their information to the CP.

Step 3 is description. The CP retrieves the description of the CD. The CP receives a response message from the CD, and when needed, the CP may request detailed information about the CD from the CD. Then the CD transmits its information in XML.

Step 4 is control. The CP operates the CD by controlling functions of the CD. If the CP intends to control any CD, the CP invokes an action of an intended service on the CD based on detailed information about the CD by SOAP. SOAP is a protocol written in HTTP based on XML to make a remote function call.

Step 5 is eventing. The CP receives an event message from the CD. To receive the event message from the CD, the CP transmits a request of subscription to an event to the CD. When the subscription is successful, the CD transmits the event message to the CP by General Event Notification Architecture (GENA).

Step 6 is presentation. The CP displays the state of the CD using the HTML of the CD.

With reference to FIG. 1, a UPnP control operation will be described in more detail. FIG. 1 is a diagram illustrating a signal flow for a conventional UPnP control method. Referring to FIG. 1, when a CP 11 discovers a CD 12 in step 100, the CP transmits an action request to the CD 12 in step 101. In step 102, the CD 12 executes the requested action and changes the state of the CD 12 according to the executed action. The CD 12 notifies the CP 11 of an execution result by a response in step 103. That is, the CD 12 executes the requested action and then transmits a normal processing result or an error message to the CP 11.

The UPnP CD may provide various service functions to the CP based on this UPnP basic control mechanism (UPnP device architecture). For example, the UPnP CP may control the UPnP CD to reproduce Audio/Video (A/V) contents in another UPnP CD that provides a rendering service according to the UPnP basic control mechanism. If the UPnP CD is a gateway, the UPnP CP may change and set an IP address, a subnet address, and a gateway address to be allocated to an in-home device by controlling the UPnP gateway CD.

UPnP Device Security is a standard technology that provides authentication/access control/encryption to a CP using a UPnP device/service. Each of a CP and a CD that implement UPnP Device Security has a public key pair and uses a hash value of a public key as its security Identifier (ID). Each CD has an ACL which is created and managed by a security console. The security console defines the ACL for services provided by the CD based on the security ID of the CP. That is, the CP transmits a service request message including the CP security ID signed with its private key to the CD and the CD determines whether to accept or reject the request, referring to the ACL.

As described above, conventionally, the CD determines whether to accept or reject a request of the CP, referring to its ACL.

Since the ACL is defined based on security IDs allocated to the CP and the CD, when different users use the same CP, there is no way to distinguish them from each other. To avert this problem, a user certificate-based security method was proposed. However, the user certificate-based security method is not suitable for a home network environment because of certificate management complexity and a large amount of resources required for public key processing.

While a method for assigning IDs to users and managing passwords based on the IDs was also proposed, it is difficult to assign and manage IDs/passwords for individual users in the home network environment. Accordingly, there exists a method for maintaining a minimum level of security and maximizing the convenience of management for the security.

SUMMARY OF THE INVENTION

An aspect of embodiments of the present invention is to address at least the problems and/or disadvantages described above and to provide at least the advantages described below. Accordingly, an aspect of embodiments of the present invention is to provide a system and method for setting up security of a CD by a CP in a home network.

In accordance with an aspect of embodiments of the present invention, there is provided a method for setting up security of a controlled device in a home network including a control point and the controlled device, in which authority to perform a function intended by a user is acquired through authentication between the control point and the controlled device, a security channel is created for performing the function, and a credential setting used by the user is synchronized among controlled devices in the home network.

In accordance with another aspect of embodiments of the present invention, there is provided a system for setting up security of a controlled device by a control point in a home network having the control point and the controlled device, in which a new controlled device is added to the home network, performs user access control simultaneously with creating a self-signed certificate and a pre-shared key-based security channel with the control point upon request from the control point or a user, and transmits an access control list upon request from the control point or the user having an administrator authority, a plurality of controlled devices are connected to the home network and notify the control point whether the controlled devices have credentials set, upon request of the control point, and the control point performs authentication with an authenticated controlled device in the home network, requests execution of a function of the controlled device through a security channel created during the authentication, transitions to an administration mode, upon discovery of the new controlled device in the home network, and acquires the administration authority over the new controlled device, determines whether there is at least one controlled device for which credentials are set among the controlled devices in the home network, acquires a credential setting list from the at least one controlled device for which credentials are set, if there is the at least one controlled device for which credentials are set, acquires an access control list from the new controlled device, changes the credential setting list and the access control list upon user request, transmits the changed access control list to the new controlled device, and synchronizes a credential setting with the at least one controlled device for which credentials are set using the changed credential setting list.

BRIEF DESCRIPTION OF THE DRAWINGS

The above and other objects, features and advantages of certain embodiments of the present invention will be more apparent from the following detailed description taken in conjunction with the accompanying drawings, in which:

FIG. 4 is a diagram illustrating a user interface screen for credential setting and ACL setting of the CP according to an embodiment of the present invention;

FIGS. 10A to 10D are diagrams illustrating ACL and credential setting screens according to embodiments of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A detailed description will be made of an operation for setting the security of a Controlled Device (CD) by a Control Point (CP) according to an embodiment of the present invention, with reference to FIGS. 2 and 3.

In the present invention, a CP is authorized to perform a user-intended function through authentication between the CP and a CD, the CP establishes a security channel for performing the user-intended function and synchronizes a credential setting among CDs in a network, in order to set up the security of the CD.

Figure 1:
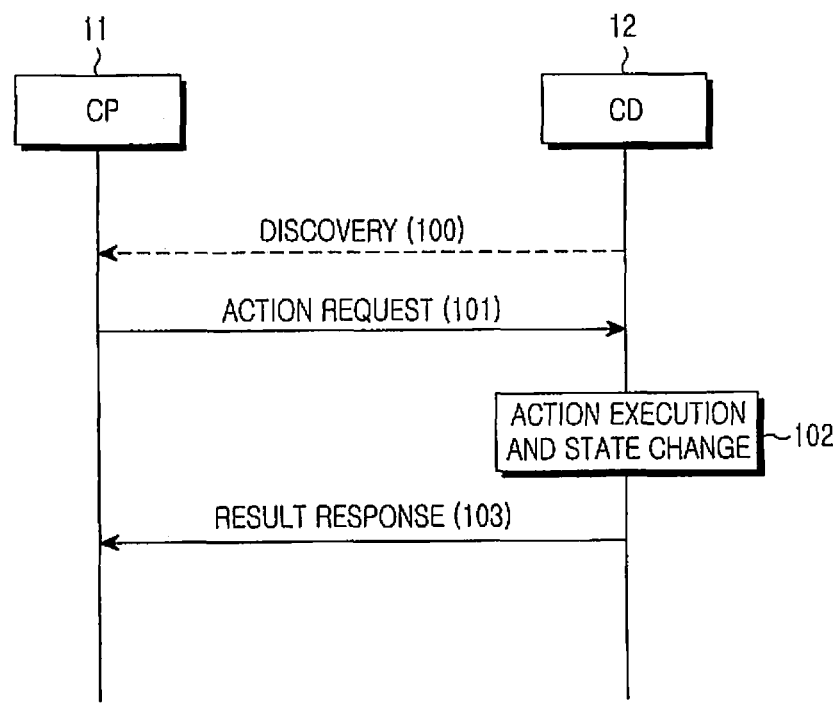
FIG. 1 is a diagram illustrating a signal flow for a conventional UPnP control method.
Figure 2:
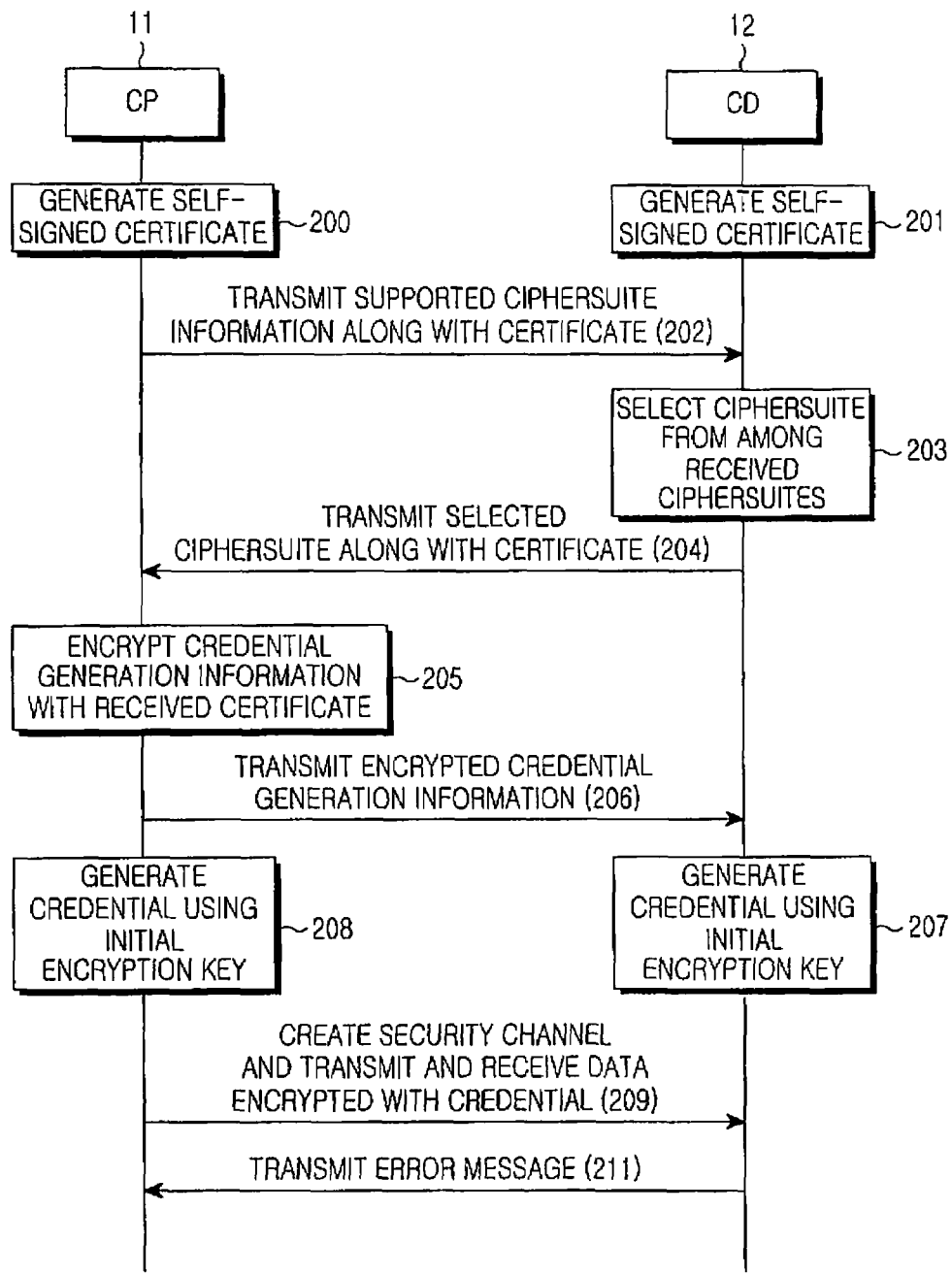
FIG. 2 is a signal flow diagram illustrating an operation for establishing a security channel between a Control Point (CP) and a Controlled Device (CD) according to an embodiment of the present invention.

FIG. 2 is a signal flow diagram illustrating an operation for establishing a security channel between a CP and a CD according to an embodiment of the present invention.

In the embodiment of the present invention, an operation for establishing a security channel using a preset initial encryption key of a CD will be described. The default value of the initial encryption key of the CD may be provided by a manual of the CD or provided only to a home manager or an owner of the CD by a separately procured safe method. The initial encryption key may be set to a new value other than the default value.

Besides the initial encryption key, the CD has a public encryption key by which it may be assigned a general authority. The value of the public encryption key is printed onto an external label of the CD or provided to a user through a display peripheral device. The public encryption key value is basically provided to the user, not to the home manager.

Referring to FIG. 2, the CP 11 generates a self-signed certificate in step 200 and the CD 12 generates a self-signed certificate in step 201. Once the self-signed certificates are initially generated in the CP 11 and the CD 12, the self-signed certificates may be used continuously. The self-signed certificates may be re-generated upon request of the home manager.

In step 202, the CP 11 transmits to the CD 12 information about ciphersuites that it supports for message transmission and reception to and from the CD 12 along with its self-signed certificate.

The CD 12 selects a ciphersuite supported by it from the received ciphersuite information in step 203 and transmits information about the selected ciphersuite along with its self-signed certificated to the CP 11 in step 204.

In step 205, the CP 11 encrypts credential generation information such as a random value, client version information, etc., used for credential generation with the self-signed certificate of the CD 12.

The CP 11 transmits the encrypted credential generation information to the CD 12 in step 206. Herein, the CP 11 transmits the encrypted credential generation information to the CD 12 by the ciphersuite selected by the CD 12.

In step 207, the CD 12 generates its credential based on the received credential generation information and an initial encryption key such as a predetermined Personal Identification Number (PIN) or an administrator encryption key. The CP 11 also generates its credential using the credential generation information and the initial encryption key in step 208.

The CP 11 and the CD 12 encrypt data using the credentials simultaneously with establishing a security channel between the CP 11 and the CD 12, and transmit and receive the encrypted data in step 209. In the present invention, the credentials generated by the CP 11 and the CD 12 may be verified according to whether errors are detected during decoding the encrypted data, without any particular verification. If the credentials generated are not verified, the CD 12 may be transmitted to error message like in step 211.

As described above, as the credentials are generated using the self-assigned certificates and the initial encryption key, and, at the same time, the security channel is established, thus, there is no need for verifying the certificates through a separate certificate verifier and the time and resources taken for verifying the credentials in the CP and the CD are reduced.

In the foregoing embodiment of the present invention, the operation for establishing a security channel between the CP 11 and the CD 12 using an initial encryption key such as a predetermined Personal Identification Number (PIN) or an administrator encryption key has been described above. It may be further contemplated as another embodiment of the present invention that when a new CD is discovered after the security channel is established between the CP 11 and the CD 12, the CP 11 establishes a security channel with the new CD using the credential set up with the CD 12.

Specifically, when a new CD is added to the network after setup of the security channel between the CP 11 and the CD 12, the CP 11 discovers the un-authenticated CD. Upon receipt of an administrator encryption key of the discovered CD through the home manager or user having knowledge of the administrator encryption key of the discovered CD, the CP 11 establishes a new security channel with the new CD and acquires an administrator authority over the new CD. Then the CP 11 collects credential setting information used with the existing CD 12 connected to the CP 11 via the already established security channel and transmits the collected credential setting information to the new CD via the new security channel. Therefore, even when the new CD is added after the setup of the security channel between the CP 11 and the CD 12, the security of the new CD can be easily set up using existing credential setting information in the present invention.

Figure 3:
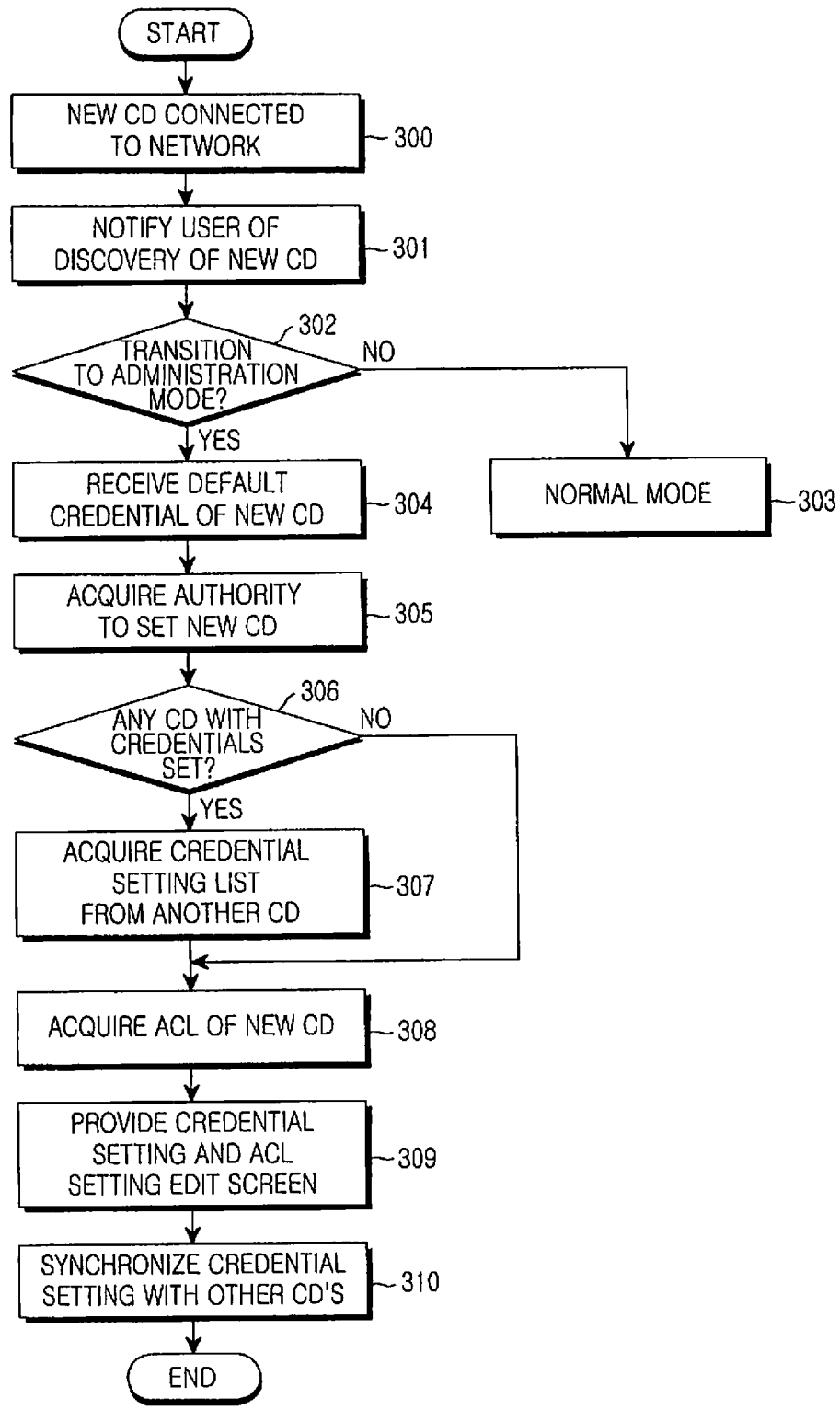
FIG. 3 is a flowchart illustrating an operation for setting an Access Control List (ACL) and credentials in a CP according to an embodiment of the present invention.

FIG. 3 is a flowchart illustrating an operation for setting an Access Control List (ACL) and credentials in a CP according to an exemplary embodiment of the present invention. Referring to FIG. 3, when a new CD 12 joins a home network in step 300, the CP 11 notifies a user of the connection of the new CD 12 to the home network by a Universal Plug and Play (UPnP) discovery mechanism in step 301. In step 302, the CP 11 determines whether the user has requested a change of settings of the new CD 12. Upon receipt of the user request, the CP 11 goes to step 304 and otherwise, the CP 11 operates in the normal mode in step 303. In step 304, the CP 11 receives an initial encryption key of the new CD 12 to be authorized to change the settings of the new CD 12. The initial encryption key may be attached in the form of a printed label to the CD 12, or it may be set as a given default value. The initial encryption key is set as one of encryption keys for an administrator role of the CD 12. In step 305, the CP 11 is authorized to obtain, create, change, and delete a credential setting of the CD 12 and to obtain and change an ACL for the CD 12. When authorized to set the CD 12, the CP 11 determines whether there is a CD for which credentials have been set in the home network in step 306. In the presence of the CD with credentials set, the CP 11 proceeds to step 307 and otherwise, the CP 11 goes to step 308.

In an example of making a decision as to the presence or absence of a CD with credentials set, each CD may provide the CP with information about whether credentials have been set for the CP and information about the time (timestamp) when the security setup is synchronized by the CP, in the description step of the CD. In another example, the administration-mode CP may invoke an action requesting information indicating whether credentials have been set on every CD in the home network.

In the presence of CDs for which credentials have been set in the network in step 306, the administration-mode CP 11 acquires a credential setting list of a latest CD synchronized with the administration-mode CP 11 in step 307. In step 308, the administration-mode CP 11 acquires the ACL list of the new CD 12 independently of the acquisition of the credential setting list. Subsequently, the administration-mode CP 11 provides the user with a screen on which the credential setting and ACL setting can be edited in step 309. When a default ACL setting of the new CD 12 needs to be changed, the user may change the default ACL setting through the edit screen. Also, when the user wants to add a new credential to credentials mapped to roles set in the home network, the user may change the credential setting through the edit screen. Upon completion of the ACL and credential setting, the CP 11 updates the ACL for the new CD and synchronizes the changed credential setting with the other CDs in the network in step 310.

To be more specific, when setting up security of the new CD 12, the CP 11 enumerates a set of services or actions that the new CD 12 provides and basically defined in-home roles. Then the CP 11 selects part of the services or actions of the new CD 12 and authorizes the in-home roles to execute the selected services or actions. In addition, the administration-mode CP 11 enumerates the in-home roles basically defined during setting credentials for existing CDs, acquires a credential list for use in acquiring authority granted to each role, and displays the credential list. The administration-mode CP 11 adds new credential information in the credential list and synchronizes the resulting credential list with available CDs on the network so that they share the credential list.

The edit screen for editing the credential setting and ACL setting, provided by the administration-mode CP 11 will be described in more detail with reference to FIG. 4.

FIG. 4 is a diagram illustrating a user interface screen for credential setting and ACL setting, provided by a CP according to an embodiment of the present invention. Referring to FIG. 4, an ACL setting item 400 is used to edit authorization states of CDs according to roles. Basically, the ACL setting item 400 provides the roles of manager, home owner, and visitor. A credential setting item 401 is used to edit credentials allocated to the user for CP authentication. Whatever CD is selected in the home network, the same credential setting can be read and edited. When the user presses a credential setting synchronization button 402 after the edit operation, the CP 11 stores the changed credential setting in all available CDs of the home network. In addition to the credential setting, the time of the administration-mode CP 11 or the times of the CDs at the moment the synchronization is requested, and information about the CDs participating in the synchronization may be stored together. If the credential setting is synchronized in the absence of some CDs, the stored information may be used for synchronization to the latest credential setting when the absent CDs are connected to the network again.

An operation for executing a protected action in the normal-mode CP 11 using the CD 12 for which an ACL and an encryption key have been completely set will be described below with reference to FIG. 5.

Figure 5:
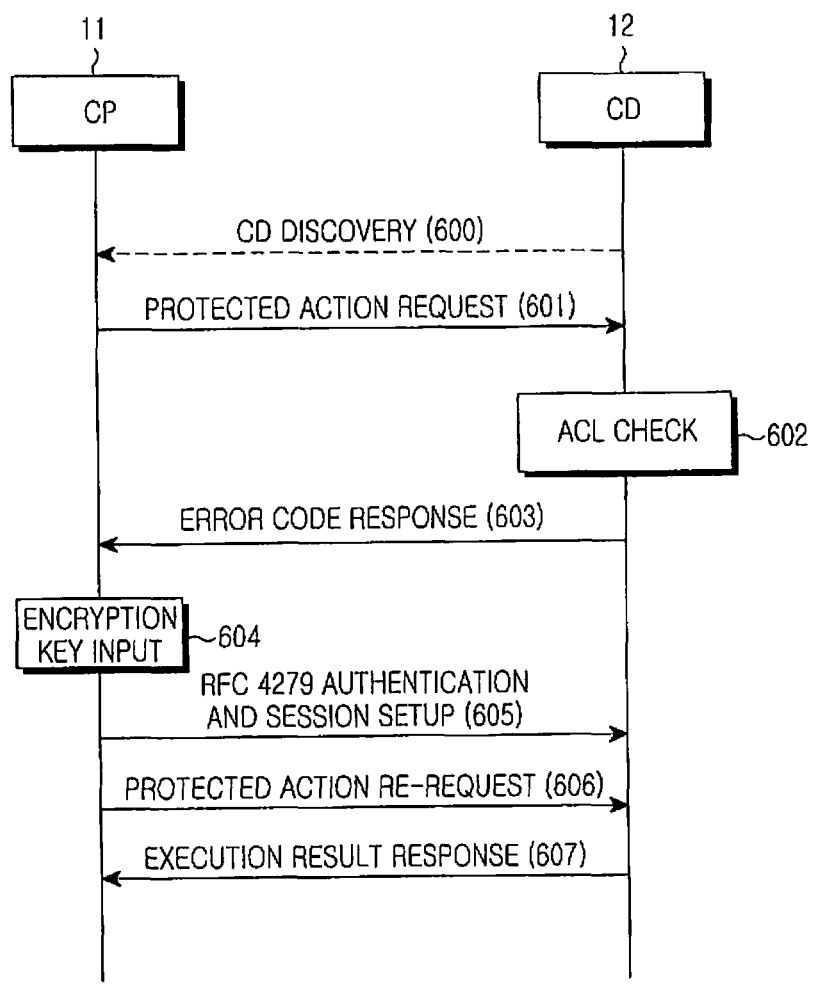
FIG. 5 is a signal flow diagram illustrating an operation for executing a protected action in a normal-mode CP using a CD for which an ACL and an encryption key have been completely set according to an embodiment of the present invention.

FIG. 5 is a flowchart illustrating an operation for executing a protected action in a normal-mode CP using a CD for which an ACL and an encryption key have been completely set according to an embodiment of the present invention. Referring to FIG. 5, upon discovery of the CD 12 in step 500, the CP 11 requests the CD 12 to execute a protected action set to be executable only by a CP playing a predetermined role in the ACL among actions provided by the CD 12 in step 501. In step 502, the CD 12 determines whether the requested protected action requires authentication and protection session setting, referring to the ACL. The CD 12 replies with an error code such as error code 709 indicating that the requested protected action requires authentication and protection session setting in step 503. Upon receipt of error code 709, the CP 11 requests input of an encryption key to the user in step 504. In step 505, the CP 11 authenticates the encryption key received from the user, or an encryption key already received from the user through the CD 12 and establishes a Transport Layer Security (TLS) connection. The authentication and session connection may be carried out in the manner defined in RFC 4279. Then the CP 11 re-requests the protected action to the CD 12 via the TLS connection in step 506. The CD 12 transmits a response indicating an execution result to the CP 11 in step 507.

Figure 6:
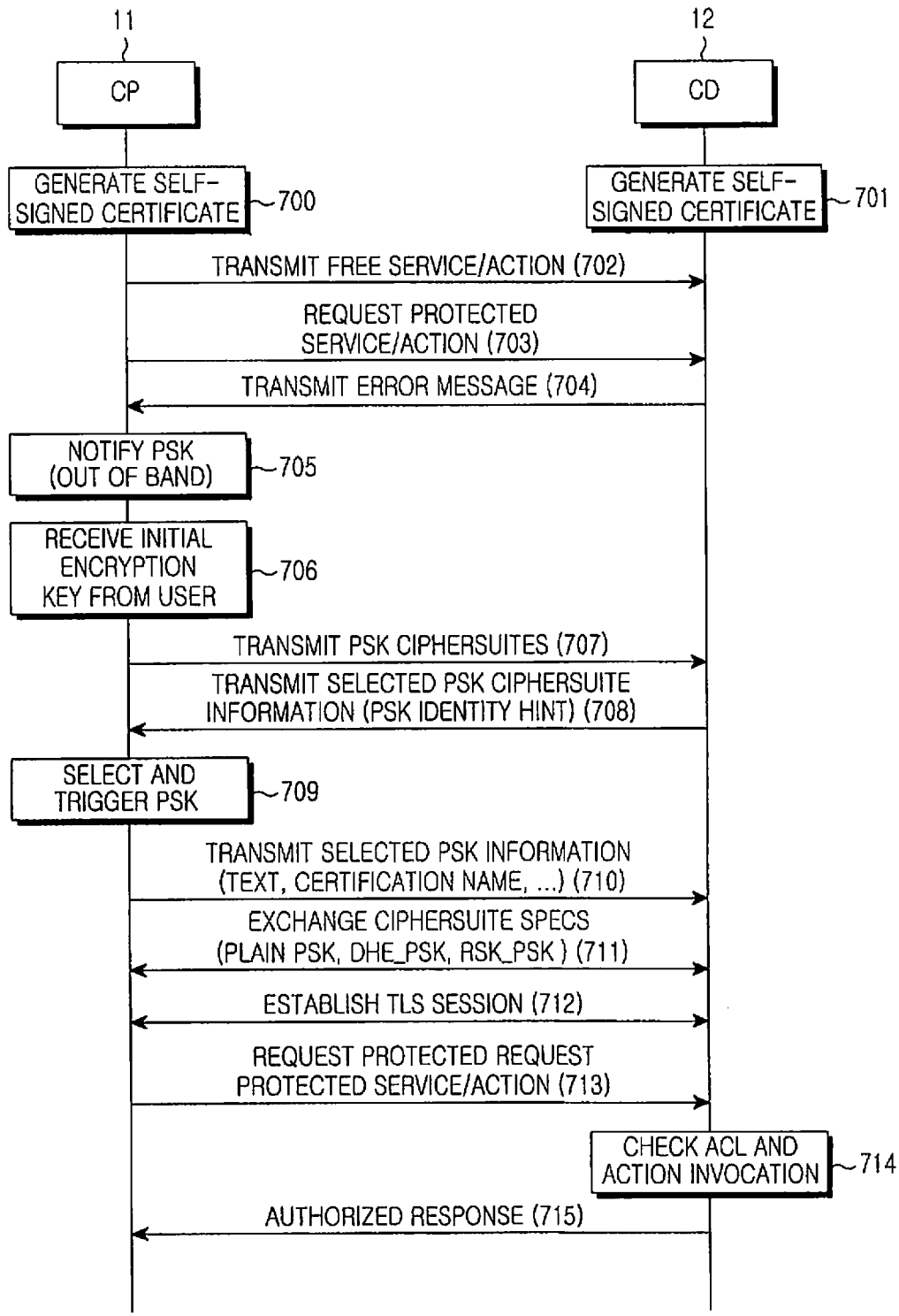
FIG. 6 signal flow diagram illustrating an operation for performing a Pre-Shared Key (PSK)-based protected service/action according to an embodiment of the present invention.
Figure 7:
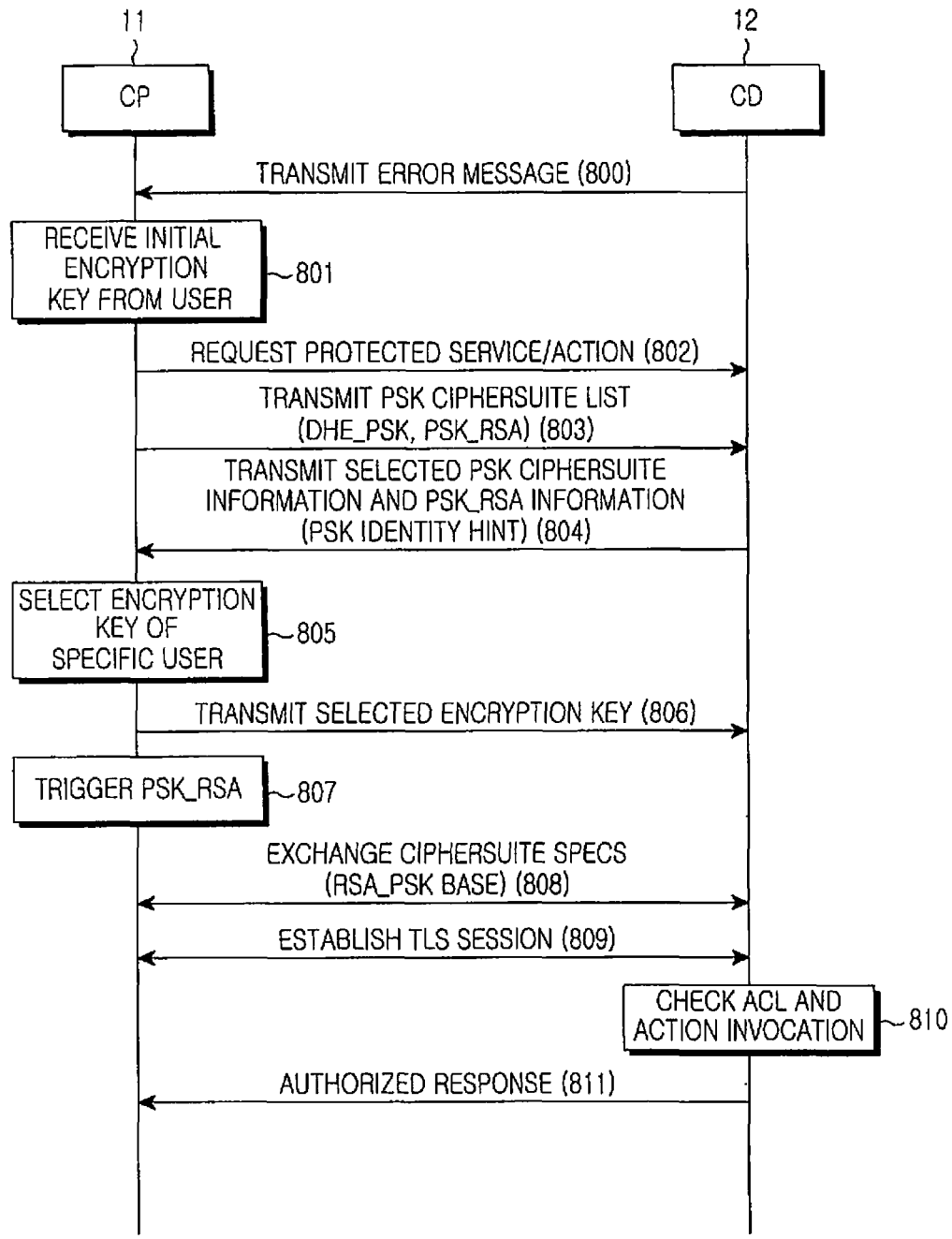
FIG. 7 signal flow diagram illustrating an embodiment of the operation illustrated in FIG. 6.

FIG. 6 is a flow diagram illustrating an operation for checking an ID to perform a UPnP protected service/action based on a Pre-Shared Key (PSK), determining whether the protected action is to be performed by checking permission in the ACL of a CD based on the ID, and notifying a CP of a result of the action execution securely in a TLS session. FIG. 7 illustrates an embodiment of the operation of FIG. 6.

In accordance with the embodiment of the present invention, a case where the CP 11 is already present in the home network and the CD 12 is used for the first time or used initially after reset will be described by way of example. In this case, the CP 11 uses the already generated self-signed certificate and only the CD 12 generates a self-signed certificate.

Referring to FIG. 6, the CD 12 permits a free service/action as in the conventional general UPnP operation in step 702. Upon receipt of a request for a protected service/action in step 703, the CD 12 returns an error message indicating that authentication and channel protection are required to the CP 11 in step 704.

Then the CP 11 notifies a PSK in step 705. In step 706, the CP 11 requests the user to enter the initial or predefined encryption key of the CD 12 and receives it from the user. The PSK notification provides a predefined encryption key by a label sticker of the CD 12 or through a display. This PSK notification is optional, and may not be performed when the user is already aware of the PSK.

In step 707, the CP 11 transmits a supported PSK ciphersuite list to the CD 12. For example, the following RSA-based ciphersuites may be provided among the supported PSK ciphersuites:

TLS_RSA_PSK_WITH_RC4_128_SHA={0x00, 0x92};
TLS_RSA_PSK_WITH_3DES_EDE_CBC_SHA={0x00, 0x93};
TLS_RSA_PSK_WITH_AES_128_CBC_SHA={0x00, 0x94}; and/or
TLS_RSA_PSK_WITH_AES_256_CBC_SHA={0x00, 0x95}.

Upon receipt of the ciphersuites, the CD 12 selects one of the ciphersuites that matches to its supported ciphersuite list and transmits the selected ciphersuite to the CP 11 in step 708. At the same time, the CD 12 may transmit its self-signed certificate and information about a credential to be used (PSK identity hint). The credential information may include information about an application for which a security channel will be used. For example, "UPnP DeviceProtection:1".

The CP 11 selects and triggers a PSK for the response in step 709 and transmits to the CD 12 a value (EncryptedPreMasterSecret) for generating its self-signed certificate and a master encryption key (master secret), and information (PSK identity) about an encryption key (PSK) value used for EncryptedPreMasterSecret in step 710.

EncryptedPreMasterSecret may be a value resulting from encrypting a random number generated by the CP 11 using the self-signed certificate received from the CD 12. Also, the PSK identity may be "Device_PIN" assigned to the CD 12 or "Admin_PIN" assigned to the administrator.

In step 711, the CP 11 and the CD 12 exchange ciphersuite specifications with each other.

The CD 12, which has received the above value, may recover the random number generated from the CP 11 from EncryptedPreMasterSecret and generate a master encryption key value (master secret) using the random number and a stored encryption key value. The CP 11 also generates the same master encryption key value (master secret) using the random number used for EncryptedPreMasterSecret and the encryption key value (PSK) received from the user. The master encryption key is used for channel encryption between the CP and the CD.

Thus the CP 11 establishes a TLS session with the CD 12 in step 712 and the CD 12 checks an ACL and action invocation in step 713. Then the CD 12 transmits an authorized response to the CP 11 in step 714.

That is, the CP and the CD perform the verification and mutual authentication of the self-signed certificates and the security channel setup simultaneously in the above operation.

Referring to FIG. 7, the CD 12 returns an error message as in step 704 of FIG. 7 in step 800 and the CP 11 receives an initial encryption key from the user in step 801. Then the CP 11 requests a protected service/action in step 802 and transmits a supported PSK ciphersuite list to the CD 12 in step 803. In step 804, the CD 12 selects one of the ciphersuites that matches to its supported ciphersuite list and transmits the selected ciphersuite to the CP 11 in step 804. Then the CP 11 selects encryption key information about a specific user in step 805, transmits the selected encryption key information to the CD 12 in step 806, and triggers RSA_PSK in step 807. The subsequent steps 808 to 811 of FIG. 7 are performed in the same manner as steps 711 to 714 of FIG. 6 and their detailed description is not provided herein.

FIGS. 8A to 8F illustrate scenarios that can be actually implemented between a CP supporting security setup (Security) and a CD by combining PSK_TLS with UPnP according to the present invention. Specifically, they are embodiments that apply security setup to an operation between a Digital TV (DTV) configured with a UPnP AV renderer and an AV CP and an AV media server.

Figure 8A:
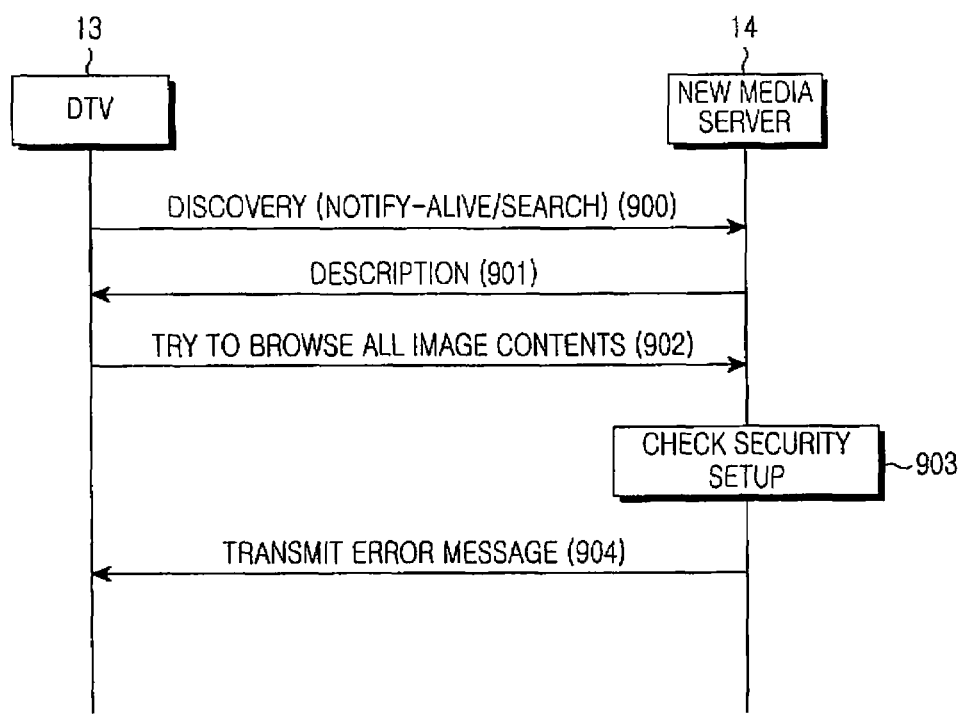
FIGS. 8A to 8F are signal flow diagrams illustrating scenarios that can be implemented between a CP and a CD that support PSK_Transport Layer Security (TLS)-based security setup according to an embodiment of the present invention.

FIG. 8A illustrates an operation for returning an error message indicating that security setup is required, when a new media server 14 is connected to the home network and a DTV 13 requests a protected service of the new media server 14, for example, browsing a list of all image contents stored in the new media server 14. Referring to FIG. 8A, after discovery and description of the new media server 14 in steps 900 and step 901, the DTV 13 attempts to browse all image contents from the new media server 14 in step 902. The new media server 14 checks its security setup in step 903 and transmits to the DTV 13 an error indicating that a security setup is required in step 904.

Figure 8B:
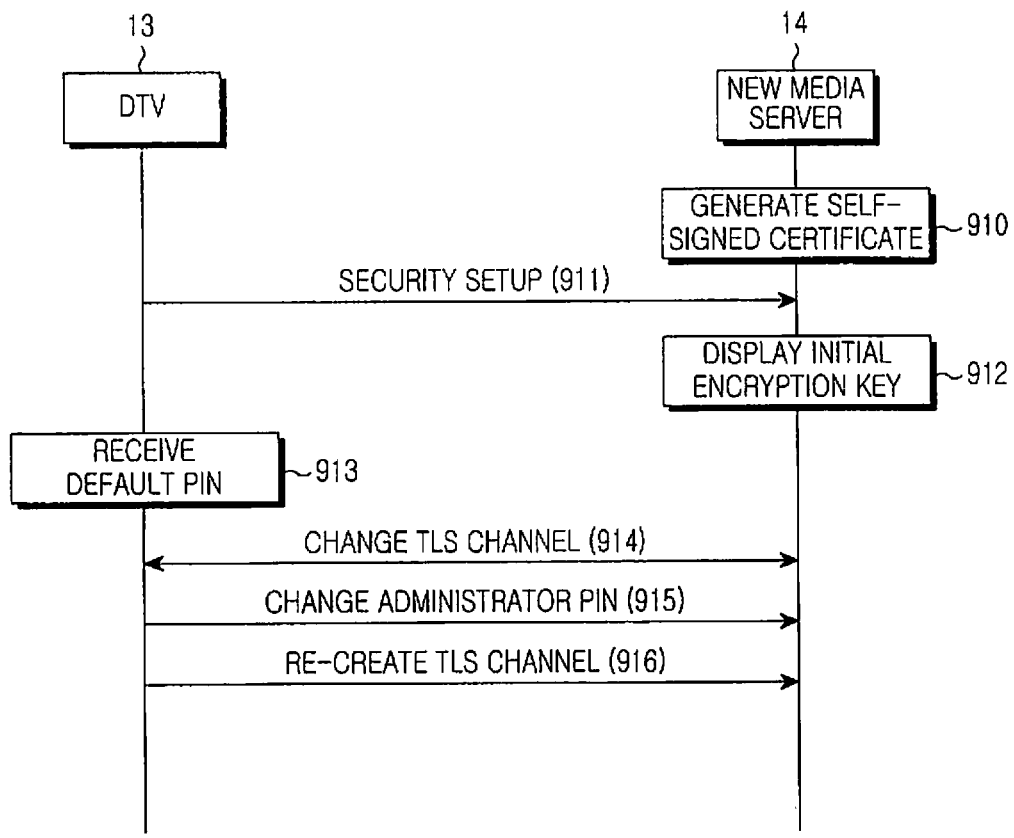

FIG. 8B illustrates an operation for determining that self-signed certificates are valid and creating a security channel in the DTV and the new media server in the procedures of FIGS. 6 and 7. Referring to FIG. 8B, for the security setup, the DTV 13 uses its already generated self-signed certificate and the new media server 14 generates a self-signed certificate in step 910. In step 911, the DTV 13 sets up the security of the new media server 14. The new media server 14 transmits information about an initial encryption key (PSK information) to the DTV 13 by displaying the initial encryption key in step 912. The DTV 13 receives a default PIN from the user in step 913 and establishes a TLS channel with the new media device 14 using the default PIN in step 914. When the media server 14 has a display peripheral device, the DTV 13 may request the media server 14 to output its default PIN on the display peripheral device. Also, the DTV 13 may change the default PIN of the media server 14 to a different value, optionally in step 915. Thus, not a PIN stored in the DTV 13 but a user-set PIN may be used as the default PIN later. In step 916, the TLS channel may be recreated using the changed PIN. Steps 915 and 916 of FIG. 9B correspond to the above process, which is optional.

Figure 8C:
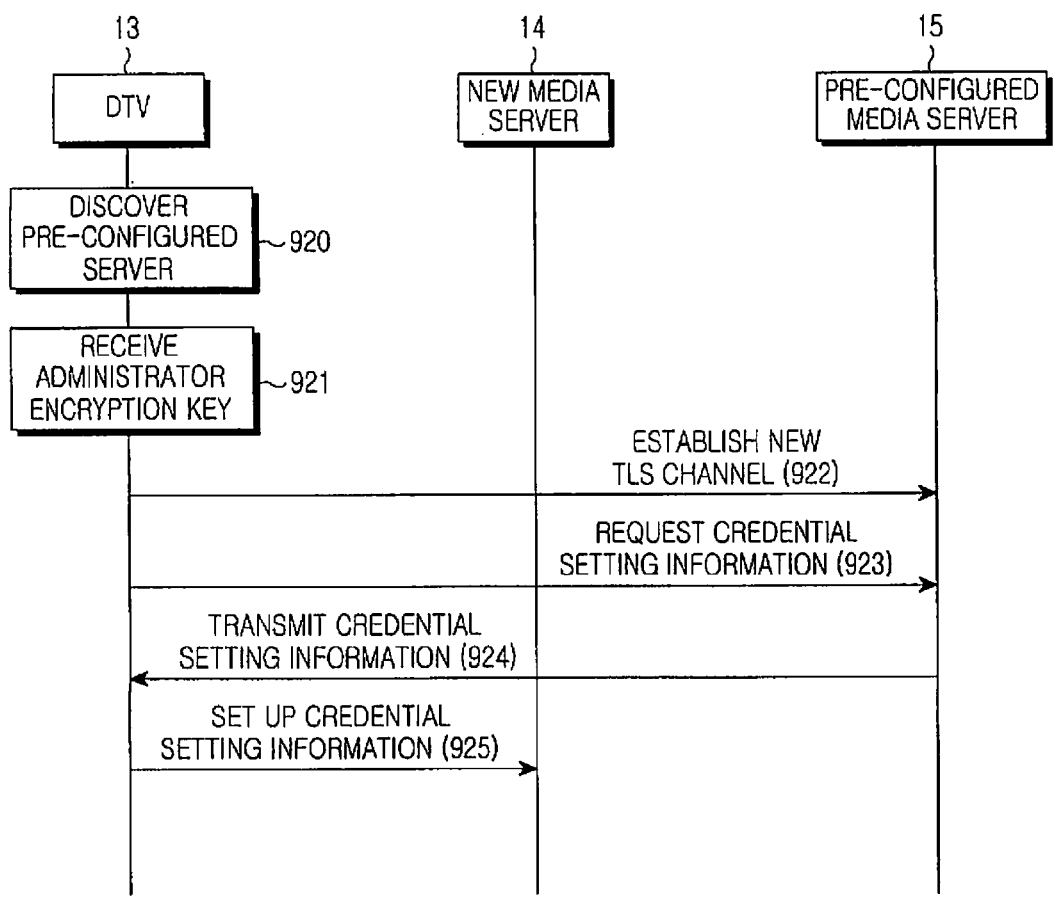

FIG. 8C illustrates an operation for, when there exists a pre-configured media server, transmitting credential setting information about the pre-configured media server to a new added media server. Referring to FIG. 8C, when the DTV 12 discovers a media server 15 for which credentials have been set in the home network in step 920, the DTV 12 receives an administrator encryption key from the user to establish an administrator security channel with the pre-configured media server 15 in step 921. Upon receipt of the administrator secure key from the user, the DTV 13 creates a new security channel with the pore-configured media server 15 in step 922 and requests credential setting information to the pre-configured media server 15 via the new security channel in step 923. The pre-configured media server 15 transmits the requested credential setting information to the DTV 13 via the new security channel in step 924. In step 925, the DTV 13 sets credential setting information with the new media server 14 using the received credential setting information.

Figure 8D:
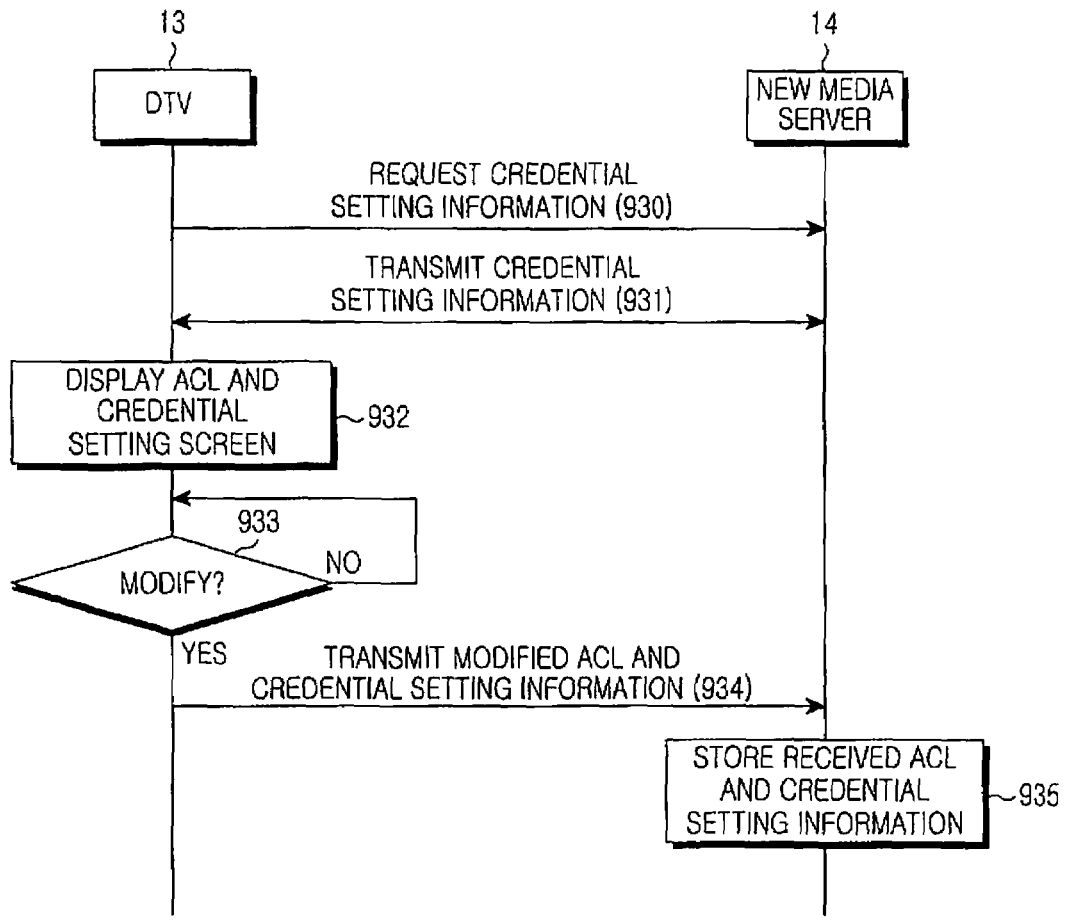

FIG. 8D illustrates an example of amending/adding an ACL and credentials of the new media server in the DTV. Specifically, the DTV 13 requests credential setting information formed with an ACL and credentials to the new media server 930. The new media server 14 transmits the requested credential setting information to the DTV 13 in step 931. The DTV 13 displays the ACL and credentials included in the received credential setting information through a user interface in step 932. When the user amends the ACL and credentials in step 933, the DTV 13 transmits the amended ACL and credentials to the new media server 14 in step 934. The new media server 14 stores the received ACL and credentials in step 935.

The above procedure is carried out by an owner of the media server or an administrator of the home network. That is, the procedure is performed in a protected state through a security channel created based on the encryption key of the media server owner or the home network administrator.

Figure 8E:
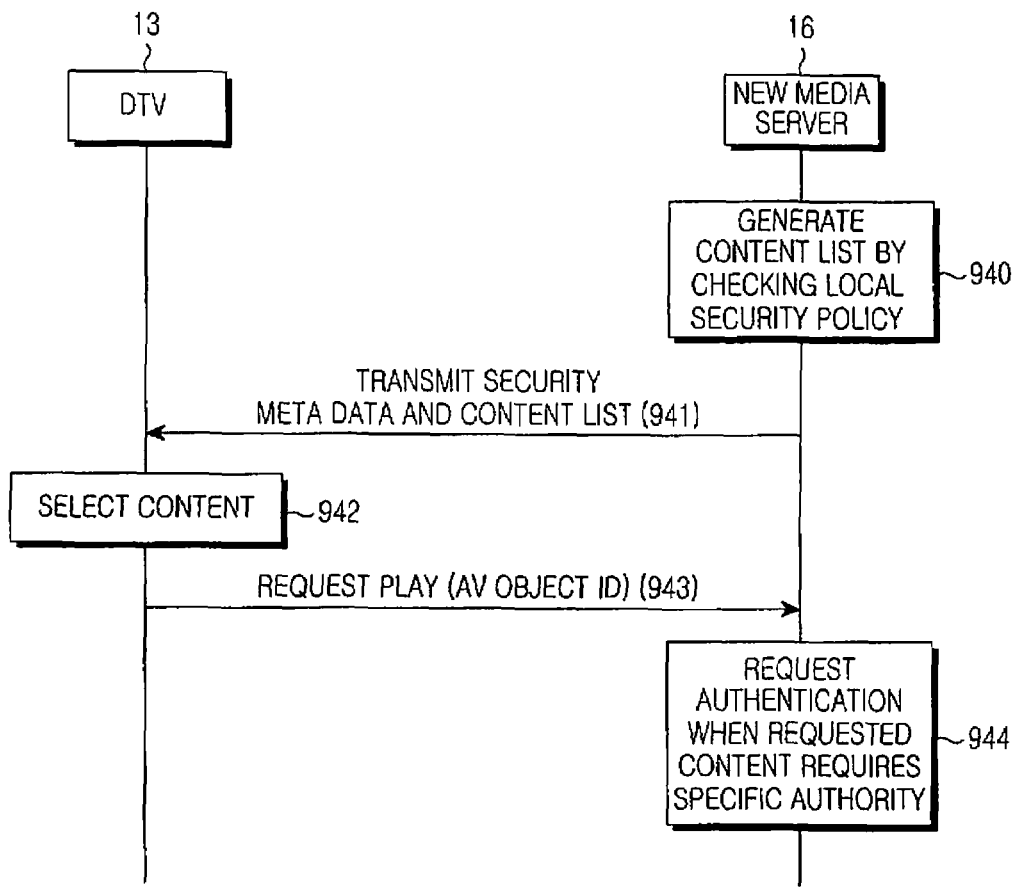
Figure 8F:
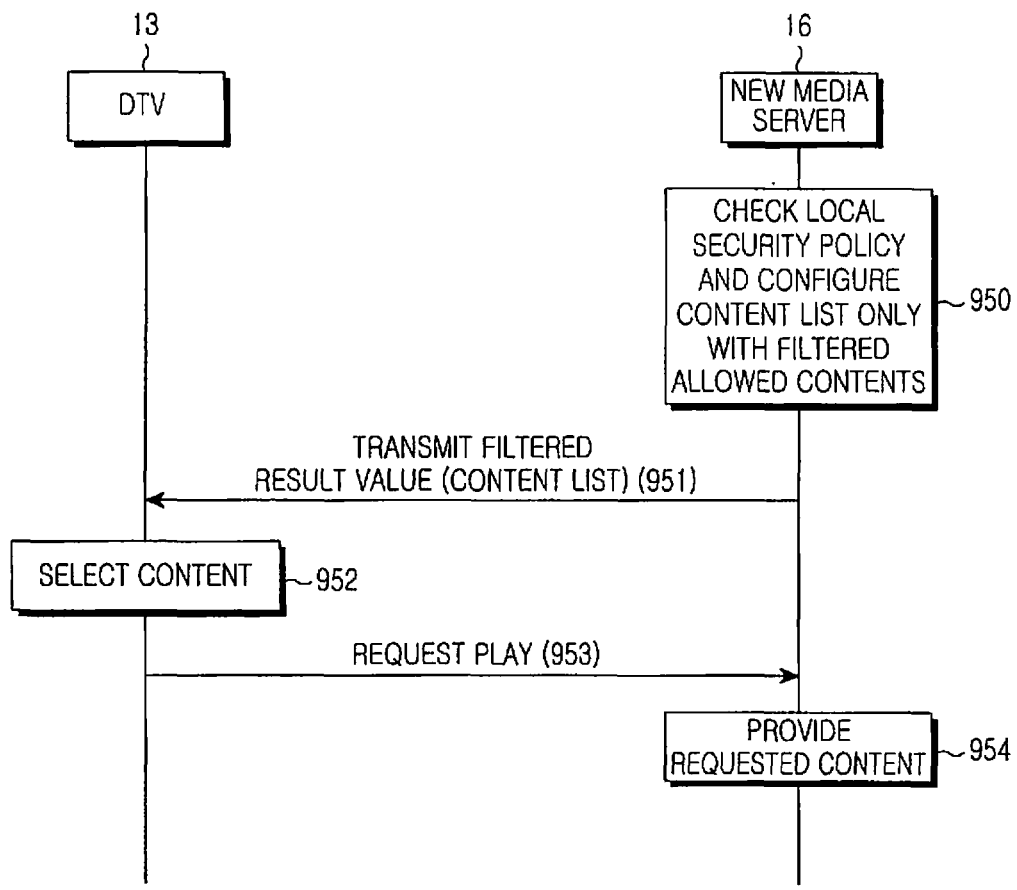

FIG. 8E is a diagram illustrating a signal flow for an operation for performing an access control for a user, when credentials are assigned on a user basis according to an exemplary embodiment of the present invention, and FIG. 8F is a diagram illustrating a signal flow for an operation for performing an access control for a user, when credentials are assigned on a user basis according to another exemplary embodiment of the present invention.

Referring to FIG. 8E, a media server 16 generates a contents list by checking its local security policy in step 940 and then transmits the contents list together with security meta data to the DTV 13 in step 941. The DTV 13 selects a content from the received contents list in step 942 and requests play of the selected content to the media server 16 in step 943. In step 944, the media server 16 requests authentication, when the requested content requires a specific authorization.

Referring to FIG. 8F, the media server 16 generates a contents list by checking its local security policy and filtering only contents accessible to an authorized device or user in step 950 and then transmits the contents list together with the filtering result to the DTV 13 in step 951. The DTV 13 selects a content from the received contents list in step 952 and requests play of the selected content to the media server 16 in step 953. In step 954, the media server 16 provides the requested content.

That is, the user performs an authentication and creates a security channel between the DTV and the media server using an encryption key assigned to him. The media server may determine whether to execute a requested action, referring to an ACL, when the user requests the action based on the used encryption key information. Also, the media server may control an action execution level according to the authority of the user.

For example, the present invention may provide a list of all contents upon receipt of a request from a user and reject a request of contents from another user. Also, the present invention may provide a user only with a filtered contents list accessible to the user, upon request of the user, thereby performing access control.

Figure 9:
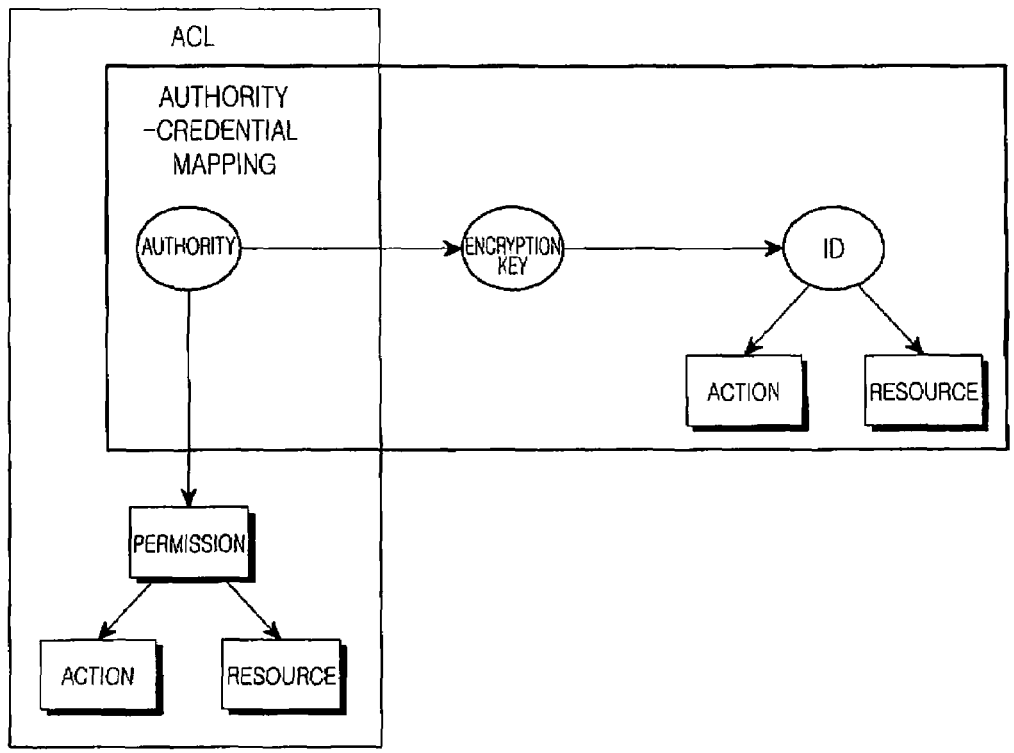
FIG. 9 is a diagram illustrating a relationship among entities used for security setup according to an embodiment of the present invention.

FIG. 9 illustrates a relationship among entities used for security up according to the present invention. Security configuration may be largely divided into an ACL and role-credential mapping (credential information). One role may have N permissions regarding N actions and N resources. The role may be mapped to N credentials, for authorization. A credential has one unique ID and the type of an ID may be a text-based name or a certificate (certificate Distinguish Name (DN)).

FIGS. 10A to 10D illustrate actual contents of credentials and an ACL managed according to exemplary embodiments of the present invention. Each entity illustrated in FIGS. 10A to 10D is a security configuration that an actual user (a user having an administrator authority) can view.

Figure 10A:
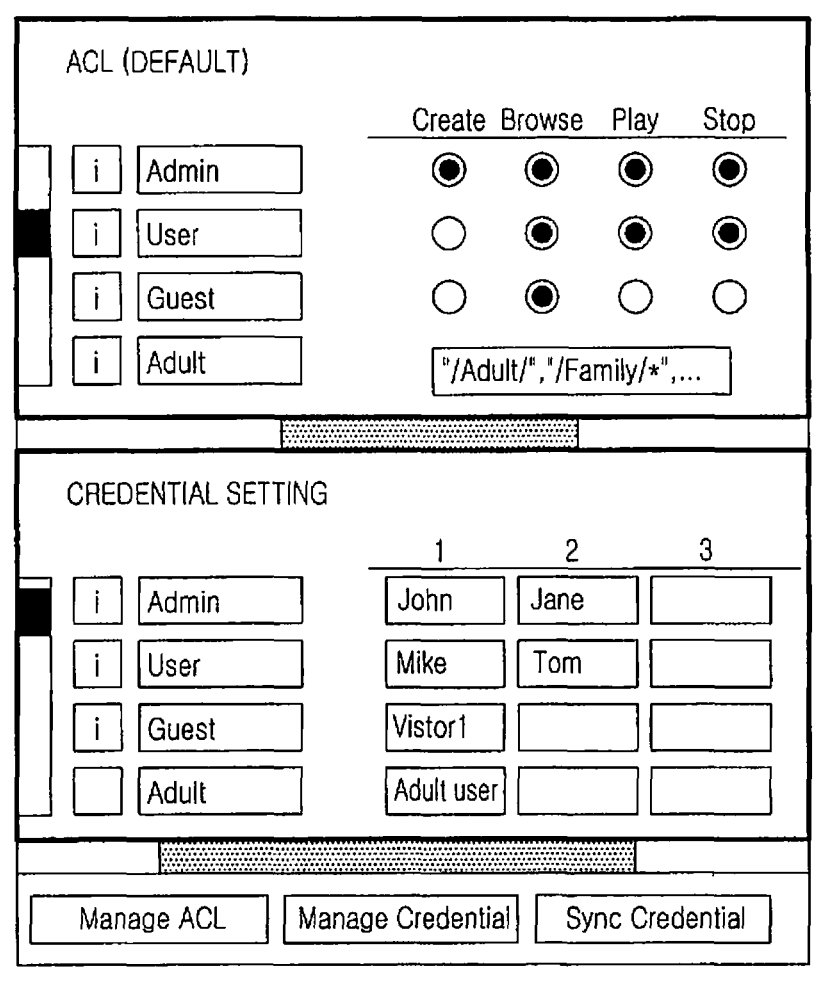
Figure 10B:
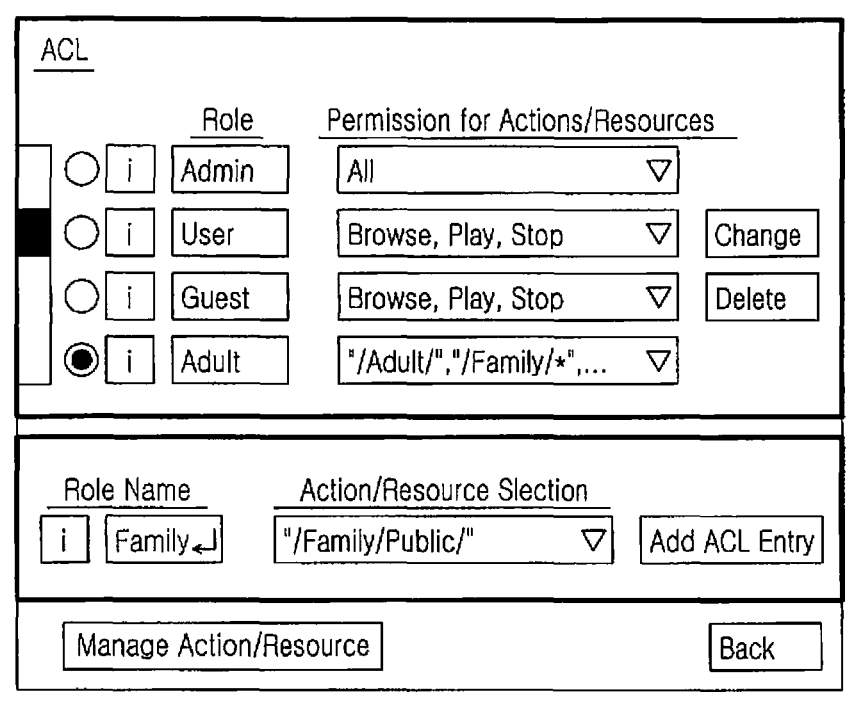

Specifically, FIG. 10A illustrates an initial screen (divided into ACL setting and credential setting) that the user sees. FIG. 10B illustrates a screen in which the ACL setting is specialized. The user may register a new ACL or modify or delete an old ACL through the screen.

FIG. 10C illustrates a screen required to map specific actions or resources to roles that can access them or to add actions and resources. FIG. 101) illustrates a relationship between users assigned for role-based credential setting and credentials set for the users. A new credential and the IDs of credentials may be added or changed. ID types available herein may include text-based names (domain names, IP addresses, etc.) or DNs included in a certificate (X.509, etc.).

As described above, the present invention manages the ACL of a CD and shares a setting of credentials mapped to roles to be authorized among all CS in the network. Therefore, the authority for individual accesses to CDs can be set and the security of all CDs in the network can be set.

The security setup of a CD through a CP that provides the administration mode renders a self-signed certificate to be reliable based on a credential such as a password or a PIN and enables a security channel to be established for function execution without any particular process. Also, in addition to setting of individual authorities of CDs for which security has been set, credentials can be set such that the resulting credential setting is shared among all CDs in the home network. The individual access control authorities of CDs are mapped according to roles and a setting of credentials used for role authentication is shared among all CDs of the network through a CP. Therefore, a normal-mode CP can be authorized to an individual access to a CD by presenting a credential mapped to a role required for using the CD.

That is, the CP notifies a home manager of the default credential of the CD and provides a credential to an in-home user according to a role, thereby appropriately controlling the access of the in-home user. For example, an administrator role is defined for each CD and the CD has an ACL setting that allows access of a CP playing a role of the administrator. A user having an administrator encryption key can use services/actions allowed to the administrator of a CD. When a new CD is added to the home network, a credential setting is shared among CDs of the network, as described before. Thus the user can use services/actions allowed to the administrator of the new CD by inputting the same administrator encryption key as used before.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for setting up security of a controlled device in a home network including a control point and the controlled device, comprising the steps of:
   acquiring authority to perform a function intended by a user through authentication between the control point and the controlled device;
   creating a security channel for performing the function; and
   synchronizing a credential setting used by the user among controlled devices in the home network,
   wherein synchronizing the credential setting comprises:
   transitioning to an administration mode, upon discovery of a new controlled device in the home network;
   acquiring an administration authority over the new controlled device;
   determining whether there is at least one controlled device for which credentials are set, among controlled devices in the home network;
   acquiring a credential setting list from the at least one controlled device for which credentials are set;
   acquiring an access control list from the new controlled device, if there is the at least one controlled device for which credentials are set;
   changing the credential setting list and the access control list upon user request;
   transmitting the changed access control list to the new controlled device; and
   synchronizing a credential setting with the at least one controlled device for which credentials are set using the changed credential setting list.

2. The method of claim 1, wherein the step of creating the security channel comprises:
   generating a self-signed certificate by each of the control point and the controlled device;
   assigning an encryption key to the user;
   storing setting information about the encryption key in the controlled device by the control point;
   determining that the self-assigned certificate is valid based on a pre-defined encryption key or the encryption key setting information stored in the controlled device;
   creating the security channel to which the authority of the user is assigned by the control point; and
   performing an intended function within the authority of the user using the security channel by the control point.

3. The method of claim 1, wherein the credential setting list is a list for editing a credential allocated to a user for authentication between the control point and a controlled device for which security is to be set, and the access control list is a list for editing authorization states of the new control device according to roles in the home network.

4. The method of claim 1, further comprising acquiring the access control list only from the new controlled device, if it is determined that there is no controlled device for which credentials are set.

5. The method of claim 1, further comprising:
   requesting, upon discovery of at least one controlled device for which the credential setting is synchronized in a normal mode after the synchronization, the controlled device to execute a service or action of the controlled device;
   determining whether an encryption key has been received from the user, upon receipt of a response indicating that the requested service or action is protected;
   sending, upon receipt of an encryption key, a request for authentication of the protected action to the controlled device using the received encryption key;

establishing a session with the controlled device, if the protected action is authenticated;

sending a request for execution of the protected action to the controlled device; and receiving a response indicating a result of the protected action from the controlled device.

6. A method for setting up security of a controlled device in a control point in a home network, comprising the steps of:

generating a self-assigned certificate and transmitting the self-assigned certificate to the controlled device;

receiving a self-assigned certificate of the controlled device from the controlled device;

encrypting credential generation information used for generating a credential using the received self-assigned certificate of the controlled device and transmitting the credential generation information to the controlled device;

establishing a security channel simultaneously with generating a credential using the credential generation information and a predefined initial encryption key; and encrypting data using the credential and transmitting the encrypted data to the controlled device.

7. The method of claim 6, further comprising:

transitioning to administration mode and acquiring an administrator authority of a new controlled device, upon discovery of the new controlled device in the home network;

determining whether there exists at least one controlled device for which credentials are set, among controlled devices of the home network;

acquiring a credential setting list from the at least one controlled device for which credentials are set and acquiring an access control list from the new controlled device, if there exists the at least one controlled device for which credentials are set;

changing the credential setting list and the access control list, upon request of a user; and transmitting the changed access control list to the new controlled device and synchronizing a credential setting with the at least one controlled device for which credentials are set using the changed credential setting list.

8. The method of claim 7, further comprising:

requesting, upon discovery of at least one controlled device with which the credential setting is synchronized in normal mode after the synchronization, the controlled device to execute a service or action of the controlled device;

determining whether an encryption key has been received from the user, upon receipt of a response indicating that the requested service or action is protected;

requesting authentication of then control point or the user to the controlled device using the encryption key, upon receipt of the encryption key from the user;

setting up a session with the controlled device, when the control point or the user is authenticated;

re-requesting execution of the protected action to the controlled device; and receiving a response indicating a result of the execution of the protected action from the controlled device.

9. The method of claim 6, further comprising:

upon receipt of an encryption key along with a request for a service or action from the user after the security channel setup, determining whether to execute the requested service or action based on information about the encryption key received from the user, referring to the access control list.

10. The method of claim 9, wherein the determination step comprises determining whether to execute the requested service or action according to an authority of the user.

11. The method of claim 8, wherein the steps are performed by the control point.

12. A method for setting up security in a controlled device in a home network, comprising the steps of:

generating a self-signed certificate and transmitting the self-signed certificate to a control point;

receiving encrypted credential generation information from the control point; and setting up a security channel simultaneously with generating a credential using the received credential generation information and a predefined initial encryption key; and encrypting data using the credential and transmitting the encrypted data to the control point.

13. The method of claim 12, wherein the steps are performed by the control point.

14. A system for setting up security of a controlled device by a control point in a home network having the control point and the controlled device, comprising:

a new controlled device added to the home network, for performing user access control simultaneously with creating a self-signed certificate and a pre-shared key-based security channel with the control point upon request from the control point or a user, and transmitting an access control list upon request from the control point or user having an administrator authority;

a plurality of controlled devices connected to the home network, for notifying the control point whether the controlled devices have credentials set, upon request of the control point; and the control point for performing authentication with an authenticated controlled device in the home network, requesting execution of a function of the controlled device through a security channel created during the authentication, transitioning to an administration mode, upon discovery of the new controlled device in the home network, and acquiring the administration authority over the new controlled device, determining whether there is at least one controlled device for which credentials are set among the controlled devices in the home network, acquiring a credential setting list from the at least one controlled device for which credentials are set, if there is the at least one controlled device for which credentials are set, acquiring an access control list from the new controlled device, changing the credential setting list and the access control list upon user request, transmitting the changed access control list to the new controlled device and synchronizing a credential setting with the at least one controlled device for which credentials are set using the changed credential setting list.

15. The system of claim 14, wherein the credential setting list is a list for editing a credential allocated to a user for authentication between the control point and a controlled device for which security is to be set, and the access control list is a list for editing authorization states of the new control device according to roles in the home network.

16. The system of claim 14, wherein the control point acquires the access control list only from the new controlled device, if it is determined that there is no controlled device for which credentials are set.

17. The system of claim 16, wherein upon discovery of at least one controlled device for which the credential setting is synchronized in normal mode after the synchronization, the control point requests the controlled device to execute a service or action of the controlled device, determines whether an encryption key has been received from the user, upon receipt of a response indicating that the requested service or action is protected, sends, upon receipt of an encryption key, a request for authentication of the protected action to the controlled device using the received encryption key, establishes a session with the controlled device, if the protected action is authenticated, sends a request for execution of the protected action to the controlled device, and receives a response indicating a result of the protected action from the controlled device.

18. The system of claim 17, wherein upon receipt of a credential along with a request for a service or action from the user, the control point determines whether to perform the requested service or action based on the received credential, referring to the access control list.

19. The system of claim 18, wherein upon receipt of a request for a service or action from the user, the control point determines whether to perform the requested service or action according to an authority of the user.

* * * * *

UNITED STATES PATENT AND TRADEMARK OFFICE
CERTIFICATE OF CORRECTION

PATENT NO.       : 8,438,615 B2                                         Page 1 of 1
APPLICATION NO.  : 12/578213
DATED            : May 7, 2013
INVENTOR(S)      : Se-Hee Han et al.

It is certified that error appears in the above-identified patent and that said Letters Patent is hereby corrected as shown below:

On the Title Page

Item (75) Inventors:

"See-Hee HAN" should be -- Se-Hee HAN --

Signed and Sealed this
Twenty-sixth Day of November, 2013

Margaret A. Focarino
*Commissioner for Patents of the United States Patent and Trademark Office*